United States Patent [11] 3,616,313

[72] Inventor John M. Mersereau
 Cheshire, Conn.
[21] Appl. No. 823,516
[22] Filed May 9, 1969
[45] Patented Oct. 26, 1971
[73] Assignee Uniroyal, Inc.
 New York, N.Y.

[54] POLYMERS BY ELECTROLYSIS OF DIBASIC ACIDS
 3 Claims, No Drawings
[52] U.S. Cl. .................................................. 204/59,
 260/78.4
[51] Int. Cl. ........................................... C08f 1/22,
 C08f 3/42, B01k 3/00

[50] Field of Search ................................. 260/78.4 D,
 94.96, 537; 204/103, 59

[56] References Cited
 UNITED STATES PATENTS
3,098,867 7/1963 Marvel et al. ................. 260/485
3,222,394 12/1965 Rowland et al. .............. 260/515
3,427,351 2/1969 Nakagawa et al. ............ 260/537
3,464,960 9/1969 Sobieski et al. ............... 260/80.3

*Primary Examiner*—Joseph L. Schofer
*Assistant Examiner*—John Kight, III
*Attorney*—Willard R. Sprowls ABSTRACT: A process is provided for synthesizing long-chain alpha, omega-dicarboxy polymers by the electrolysis of dicarboxylic acids.

POLYMERS BY ELECTROLYSIS OF DIBASIC ACIDS

This invention relates to the production of high molecular weigh dicarboxylic acids and, in particular, to a process for preparing long-chain alpha, omega-dicarboxy polymers by the electrolysis of dibasic acid monomers.

It is known to synthesize organic compounds of low molecular weight by electrolysis. For example, in Lindsey, U.S. Pat. No. 2,680,713, a process is disclosed for producing dimers from monoesters of dicarboxylic acids utilizing the well-known Kolbe electrolytic oxidation process. In essence, this process comprises subjecting a monoester of saturated alpha, omega-dicarboxylic acid to electrolysis in an inert organic solvent, e.g. methanol, containing a conjugated diene, the electrolysis being carried out under conditions suitable for producing the diester, the diester being thereafter recovered from solution by known methods.

In the Park U.S. Pat. No. 2,726,204, a process is disclosed using an aqueous rather than an organic liquid. The substrates are ethylenically unsaturated compounds and not carboxylic diacids. However, the mode of polymerization is addition and not condensation. The products are those made by any free radically initiated addition polymerization and are not polymeric diacids.

In the Forster U.S. Pat. No. 3,140,276, the monomers there disclosed are limited to unsaturated ones containing a nitrile group. Carboxylic acids are excluded by the general formula of the Forster patent. The products are polynitriles, not polymeric dibasic acids. The mode of polymerization is addition, not condensation.

Baizer U.S. Pat. No. 3,245,889 is restricted to the anionic polymerization of acrylonitrile.

It would be desirable to provide a method for producing long-chain, high molecular weigh alpha, omega-dicarboxy polymers by electrolysis of dibasic acid monomers. However, the Lindsey starting materials do not form long-chain polymers. On the contrary, the electrolysis of the Lindsey solution containing the monoester salt and the conjugated diene results in the dissociation taking place only within the carboxyl group of the monoester salt, whereby the final product is a diester.

High molecular weight alpha, omega-dicarboxylic acids are useful for many purposes, among which are included propellant binders, emulsifiers, polyester and polyurethane prepolymers, caulking bases and air-hardening coatings. The foregoing polymers are also useful as additives to plastics and rubbers to provide resistance to ozone, oxygen, heat and chemicals.

I have found that certain dibasic carboxylic acids can be converted to carboxy terminated polymers by an adaptation of the Kolbe electrolytic oxidation process. The operating conditions for carrying out the process are described in "Advances in Organic Chemistry: Methods and Results", Volume I, Interscience (1960), pages 1 to 34.

The restrictions regarding monomer types are few. The types of polymers accessible by means of the electrolytic process are numerous. Polymers not obtainable by known means are capable of being produced, for example, aplpha, omega-dicarboxy isobutylene co-methylene having a molecular weight in excess of 500.

It is thus the object of this invention to provide a process for the preparation of long-chain, high molecular weight alpha, omega-dicarboxy polymers.

Another object is to provide high molecular weight, long-chain alpha, omega-dicarboxy polymers.

These and other objects will more clearly appear from the following disclosure.

Stating it broadly, the process provided by the invention comprises uniformly distributing a dibasic acid monomer in a suitable organic solvent of high dielectric constant, for example, methanol, ethanol, dimethyl formamide, N-methylpyrrolidone, dimethyl acetamide and mixtures thereof in an ionizing environment, it being advantageous that the monomer be substantially soluble in the organic solution. In order to promote ionization in the solution where necessary, a small amount of a base may be added, such as triethylamine, sodium methoxide, benzyl trimethyl ammonium hydroxide, choline, and the like. An important consideration in selecting the base is that the resulting salt formed is soluble in the solution. Frequently, sodium alkali metal salts tend to be insoluble, whereas organic amine salts are quite soluble.

The resulting solution is placed in a vessel fitted with a reflux condenser, a stirrer and two electrodes (anode and cathode) and the mixture then subjected to electrolysis. A platinum anode and a cathode of platinum or mercury may be suitable for the purpose, it being understood that other electrode materials may be employed. The amount of direct voltage applied should be sufficient so that a current of at least about 0.1 ampere is maintained after 90 percent completion of the reaction. Initially, the current employed is quite high. Generally, this requires voltages in excess of 50 and, more advantageously, in excess of 100 volts.

In instances where the temperature might exceed 80° C. a cooling bath or cooling coils may be employed to maintain the temperature to as low as 59° C. Generally, the temperature is controlled over the range of −20° to 100° C. When the power is initially applied, the voltage is controlled so that the temperature of the solution does not exceed about 80° C. a preferred range being 0° to 30° C. Generally, the initially applied voltage averages in the neighborhood of about 50 volts (may range from about 10 to 100 volts) and, as the reaction proceeds, the voltage is increased to 100 volts or higher. Usually, the higher the voltage, the higher is the molecular weight of the final product, which molecular weigh may range from 300 to 5,000, depending upon the degree of polymerization.

The completion of the reaction is generally indicated when the applied current becomes negligible, e.g. when it drops to less than 0.1 ampere. Following substantial completion of the reaction, the solution or slurry of polymer is poured into acidified water (e.g. water acidified by hydrochloric acid) and the polymer separated by skimming, if solid, or by solvent extraction with methylene chloride or other suitable solvent, where the polymer is liquid. Any residual solvents that might be present are removed by vacuum drying, for example, at 60° C.

The dibasic monomers to which the invention is particularly applicable include those compounds having the general formula:

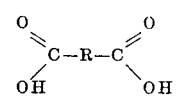

where R is a substituted or nonsubstituted diradical selected from the group consisting of alkylenes, alkenylenes, alkadienylenes, alkylidenes, alkynylenes, alkadiynylenes, arylenes, aralkylenes and alkarylenes containing one to 18 carbon atoms. These diradicals may have attached to them the following groups: alkyl, alkenyl, alkylidenyl, aryl, aralkyl, alkylaryl, naphthyl and the like. The above-mentioned diradicals may furthermore be substituted by hydroxy, ester either nitrile, sulfide, as well as chloride, bromide and fluoride groups. Generally speaking, any dicarboxylic acid capable of being dispersed or preferably soluble in the solvent may be suitable as a starting material in carrying out the invention.

Examples of such diradicals are numerous, among which the following are named: methylene, ethylene, propylene, butylene, octylene, dodecylene which all have as the repeating groups —$CH_2$— also ethenylene, propenylene, 1 or 2-butenylene, 1 or 2-pentenylenes, 1,2 or 3-hexenylenes, 1,2 of 3-heptenylenes, 1,2,3 or 4-octenylenes and the like. Other examples include 1,2-butadienylene, 1,3-butadienylene, 1,3-pentadienylene, 1,4-pentadienylene, 1,3-hexadienylene, 1,4-hexadienylene, 1,5-hexadienylene, 2,4-hexadienylene; also ethylidene, propylidene, butylidene, pentylidene; and also ethynylene, propynylene, butynylene, pentynylene and the like. Additional members of the group are 1,3-butadiynylene, 1,3-pentadiynylene, 2,4-hexadiynylene, phenylene, naphthylene, benzylene, benzene-1,4-dimethylene, benzene-1,4-divinylene and the like.

Among the substituted diradicals are included: 1-methylethylene, 1,2-dimethylethylene, 2-methylpropylene, 2-methylenepropylene, 2,2-dimethylpropylene, 1,3-dimethylpropylene, 1-ethyl-2-methylbutylene, 2-phenyl-2-ethylbutylene, 3-naphthyl-3-hexenylene, 2-xylyl-propenylene, 2-benzylethenylene, benzylidene; also 2-hydroxypropylene, 2,3-dihydroxybutylene, 4-ethoxybutylene, 5-methoxypentenylene, 2-(ethylcarboxylate)propylene, 3-propylcarboxylate-1-butenylene, 2-cyanopropylene, 4-cyanobutenylene, 3-ethylmercapto-pentylene, 4-propylmercapto-1-butenylene, 3-chloropropynylene, 4-bromobutenylene, 5-fluoropentylene, or any combination of the above-mentioned substitutions, such as 2-ethyl-3-cyanobutylene, 2,2-dimethyl-3-chloro-pentylene, 2-phenyl-3-ethoxy-butenylene, 2-cyano-3-ethylmercaptopentylene, ethylphenylene and the like.

As is apparent, by only using dicarboxylic acids as the starting materials, it is possible to obtain new high molecular weight dicarboxy terminated polymers by electrolysis. The products obtained in accordance with the invention have the following general formula:

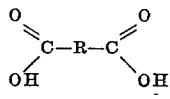

where R is a diradical selected from the group defined hereinabove, where $n$ is and integer which is at least 33 where R is methylene and where $n$ is at least 3 where R is undecamethylene or any other diradical mentioned above. By way of example, $n$ may range as high as 500. If the diradical R is of low molecular weight, it will be appreciated by those skilled in the art that $n$ can even range substantially over 500 and as high as, for example, 2,000.

As illustrative of the various embodiments of the invention, the following examples are give:

EXAMPLE 1

Conversion of Azelaic Acid to Alpha,

Omega-Dicarboxy Polyethylene

A solution containing 30 grams (0.16 mole) of azelaic acid, 5 grams of 25 percent sodium methoxide (0.053 mole equivalent) in methanol and 100 ml. of anhydrous methanol was prepared in a 2-liter flask fitted with two platinum electrodes. The flask was provided with a cooling tube to maintain the solution at a temperature below 30° C. Direct current was applied and the voltage raised to about 75 volts at an initial current of 0.5 ampere. Having carried out the electrolysis for about 48 hours, the current dropped to about 0.1 ampere. Additional methanol was added (200 ml.) which caused the current to increase to 2 amperes and the electrolysis was continued for a total of 6 days. The power was then turned off and the solid product produced was washed with cold methanol, acidified with acetic acid, then washed with water and dried. A yield of 14 grams was obtained. The product was identified as alpha, omega-dicarboxy terminated polyethylene. According to end group analysis (carboxy equivalent) on the portion of the product soluble in butanone (methyl ethyl ketone), the molecular weight was about 3,200, the integer $n$ being approximately 32. The insoluble part resembled cross-linked polyethylene in appearance and resisted attempts to melt.

EXAMPLE 2

Conversion of Sebacic Acid to Alpha,

Omega-Dicarboxy Polyethylene

As in example 1, a solution was formed in a 2-liter flask containing 100 grams of sebacic acid, 80 ml. of methanol, 20 ml. of N-methyl pyrrolidone, 10 ml. of choline base (40 percent in methanol) and 4 ml. of 50 percent benzyltrimethylammonium hydroxide. The flask was fitted with a condenser, a platinum anode and a mercury cathode. Polymerization was initiated at an initial current of about 2 amperes. After about 16 hours, 1 ml. of a nonionic emulsifier was added to reduce or inhibit coating of the anode with the polymer. Copious evolution of $CO_2$ was observed. As the current dropped drastically after 72 hours of reaction time, 2 ml. of triethanolamine was added which caused the current to increase to 2.5 amperes. An insoluble product formed which did not dissolve when 10 ml. of methyl pyrrolidone was added to the flask. The reaction mixture containing the polymer was decanted into a flask of water, following which 10 ml. of 35 percent HCl was added to precipitate the product. The product was then filtered, washed twice with distilled water, heated until melted and the melted product allowed to wax out upon the surface. The product was identified as alpha, omega-dicarboxy terminated polyethylene.

A yield of 27 grams of a waxy brown solid was obtained which was soluble in dimethyl formamide. The average molecular weight was determined by end group analysis was about 4,770, the interger $n$ being approximately 42.

EXAMPLE 3

Conversion of Dimethyl Glutaric Acid to

Alpha, Omega-Dicarboxy Isobutylene co-Methylene 1 to 1 Alternating Copolymer

To a similar reaction vessel as in the preceding example was added 30 grams of dimethylglutaric acid (DMGA), a total of 270 ml. of dry methanol (added in increments during electrolysis to maintain the solution level), 20 ml. of methyl pyrrolidone, and 15 ml. of 50 percent methanolic choline base. An initial voltage of 52 volts was applied to provide a direct current of 1 ampere through the solution, which increased to about 2.4 amperes when the voltage was raised to 100 volts. The electrolysis of the solution was continued at 1 volt for about 16 hours. As no carbon dioxide evolved, 20 ml. of benzene was added to the flask and then azeotroped off to remove any water present. Several drops of a nonionic emulsifier referred to in the trade as Pluronic L103 (a reaction product from polypropyleneglycol and ethyleneoxide) were added to inhibit the buildup of polymer on the anode. At this point, there was a copious evolution of carbon dioxide. After additional electrolysis, some solid appeared in suspension. The evolution of carbon dioxide ceased. However, by adding more mercury, the evolution of carbon dioxide continued. After 3 more days of reaction, the solution was decanted, filtered and then acidified with 10 percent hydrochloric acid. An emulsion was formed. The product in the emulsion was recovered by solvent extraction with methylene chloride. A yield of 15 grams was obtained, the product being in the form of a dark brown syrupy liquid having an intrinsic viscosity of 0.015 in dimethylformamide at 30° C. The average molecular weight as determined by end group analysis amounted to about 2,040. The product was identified as alpha, omega dicarboxy isobutylene co-methylene (i.e. alpha, omega-dicarboxypoly-2,2-dimethylpropylene).

EXAMPLE 4

Conversion of Trans-beta-Hydromuconic Acid to Alpha, Omega-Dicarboxy-trans Polybutadiene To a 100-ml. reaction vessel was added 20 grams of trans-beta-hydromuconic acid, 10 ml. of freshly distilled dimethyl-formamide dried by removal of water via a benzene azeotrope, and 1.0 ml. of 50 percent methanolic choline base. At full voltage (100 v. DC), the current was 1.8 ampere. The reaction was allowed to proceed for 40 hours and was then halted and worked up as in example 3. The average molecular weight of the brown, oily product was 466.

It is possible with the invention to produce a alpha, omega-dicarboxy polyethylene having a molecular weight in excess of 538.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A process for preparing a high molecular weight dicarboxy-terminated polymer which comprises subjecting a dicarboxylic acid to electrolysis in a solvent having a high dielectric constant and continuing said electrolysis in an ionizable environment created by the addition of a small amount of an organic base to produce a dicarboxy-terminated polymer, the temperature being maintained in the range from $-20°$ to $100°$ C. and the initially applied direct voltage being in the range from about 10 to 100 volts, the voltage being increased as the reaction proceeds so that, after 90 percent completion of the reaction, a current of at least about 0.1 ampere is maintained, said dicarboxylic acid being selected from those compounds having the general formula:

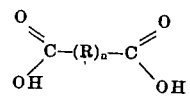

wherein R is a diradical selected from the group consisting of alkylenes, alkenylenes, alkadienylenes, alkylidenes, alkynylenes, alkadiynylenes, arylenes, aralkylenes and alkarylenes containing one to 18 carbon atoms, which diradical may be substituted by one or more of the following: alkyl, alkenyl, alkylidenyl, aryl, aralkyl, alkylaryl, naphthyl, hydroxy, ester, ether, nitrile, sulfide, chloride, bromide and fluoride groups.

2. The process of claim 1, wherein the solvent into which the dicarboxylic acid is dissolved is selected from the group consisting of methanol, ethano, dimethyl-formamide, N-methyl pyrrolidone, dimethyl acetamide and mixtures thereof.

3. The process of claim 1, wherein the organic base is selected from the group consisting of choline, triethylamine, sodium mexthoxide, benzyl trimethyl ammonium hydroxide.

* * * * *

UNITED STATES PATENT OFFICE
CERTIFICATE OF CORRECTION

Patent No. 3616313                                   Dated October 26, 1971

Inventor(s)          John M. Mersereau

It is certified that error appears in the above-identified patent and that said Letters Patent are hereby corrected as shown below:

The structural formula in Claim 1 should be rewritten to appear as follows:

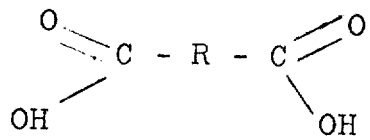

Signed and sealed this 5th day of December 1972.

(SEAL)
Attest:

EDWARD M. FLETCHER, JR.
Attesting Officer

ROBERT GOTTSCHALK
Commissioner of Patents